US007587566B2

(12) United States Patent  (10) Patent No.: US 7,587,566 B2
Ballantyne et al.  (45) Date of Patent: Sep. 8, 2009

(54) REALTIME MEMORY MANAGEMENT VIA LOCKING REALTIME THREADS AND RELATED DATA STRUCTURES

(75) Inventors: Joseph C. Ballantyne, Redmond, WA (US); Landy Wang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 191 days.

(21) Appl. No.: 10/945,093

(22) Filed: Sep. 21, 2004

(65) Prior Publication Data

US 2005/0188164 A1  Aug. 25, 2005

Related U.S. Application Data

(60) Provisional application No. 60/545,907, filed on Feb. 20, 2004.

(51) Int. Cl.
  *G06F 13/14*  (2006.01)
(52) U.S. Cl. .................. 711/163; 711/125; 711/151; 711/154; 711/159; 711/167; 711/170
(58) Field of Classification Search ................. 711/151, 711/159, 163, 170, 125, 154, 167
  See application file for complete search history.

(56) References Cited

U.S. PATENT DOCUMENTS 5,561,786 A * 10/1996 Morse ...................... 711/170
5,913,224 A *  6/1999 MacDonald ............... 711/125
6,412,053 B2 * 6/2002 Bonola ...................... 711/170
7,076,629 B2 * 7/2006 Bonola ...................... 711/170

OTHER PUBLICATIONS

Donald Knuth, "The Art of Computer Programming, vol. 1: Fundamental Algorithms." $3^{rd}$ edition. Addison-Wesley, 1997. pp. 435-444.*

(Continued)

*Primary Examiner*—Tuan V Thai
*Assistant Examiner*—Yong Choe
(74) *Attorney, Agent, or Firm*—Shook, Hardy & Bacon, LLP (57) ABSTRACT

The present invention is directed to a method and system for minimizing memory access latency during realtime processing. The method includes a mechanism for marking information that will be accessed during realtime processing. The marked information may include code, data, heaps, stacks, as well as other information. The method includes support for locking down all of the marked information so that it is present in a computing machine's physical memory so that no page faults will be incurred during realtime processing. The method additionally enables realtime processing code to allocate and free memory in a non-blocking manner. It does so by enabling the creation of heaps for use during realtime processing, wherein each heap supports allocating and freeing memory in a non-blocking fashion. Each heap tracks freed memory blocks using individual non-blocking tracking lists for each memory block size supported by that heap. If a memory allocation request to a heap can be satisfied by using a memory block available on one of the lists of freed memory blocks, the method includes allocating the available memory block by popping the memory block from the tracking list. If no freed memory blocks of the desired size are available, then the method includes traversing a separate set of source memory blocks for that heap, and making the allocation in a non-blocking fashion from one of those blocks.

24 Claims, 5 Drawing Sheets

OTHER PUBLICATIONS

"Microsoft Computer Dictionary." 5th edition. Microsoft Press, 2002, p. 495.*

Donald Knuth, "The Art of Computer Programming, vol. 1: Fundamental Algorithms." 3rd edition. Addison-Wesley, 1997. pp. 435-444.*

"Microsoft Computer Dictionary." 5th edition. Microsoft Press, 2002.*

"Stack vs Heap allocation" Sep. 3, 1994. Retrieved from: http://www-ee.eng.hawaii.edu/~tep/EE150/book/chap14/subsecion2.1.1.8.html.*

* cited by examiner

REALTIME MEMORY MANAGEMENT VIA LOCKING REALTIME THREADS AND RELATED DATA STRUCTURES

CROSS-REFERENCE TO RELATED APPLICATIONS

This application is related to U.S. Provisional Application Ser. No. 60/545,907 filed Feb. 20, 2004 entitled "SYSTEM AND METHOD FOR MEMORY MANAGEMENT", from which this application claims priority, and which application is incorporated herein by reference.

STATEMENT REGARDING FEDERALLY SPONSORED RESEARCH OR DEVELOPMENT

None.

TECHNICAL FIELD

Embodiments of the present invention relate to ensuring sufficient memory is reserved for applications during execution. More particularly, embodiments of the invention are directed to a system and method for allocating and locking memory in order to prevent realtime processing from failing to meet its deadlines.

BACKGROUND OF THE INVENTION

In computerized environments such as the Microsoft Windows™ platform produced by the Microsoft Corporation of Redmond, Wash., multiple computer applications are often utilized by a user simultaneously. The multiple computer applications may include a variety of types of applications for communications, information, media or other purposes. Multimedia applications have become increasingly popular and generally demand a large amount of memory in order to run smoothly. Often, with multiple applications launched simultaneously, memory becomes scarce. Multiple applications competing for an insufficient quantity of physical memory can result in poor performance due to the paging of virtual memory to and from disk.

In order to control distribution of Central Processing Unit (CPU) time for computer applications, a CPU reservation system may be implemented. A CPU reservation system provides a selected amount of CPU time for a computer application during a pre-defined period of time. For example, an application may reserve 1 ms of time every 10 ms. If an application thread touches pageable memory during its allotted CPU time, that thread will stop running while the system pages the memory from disk back into physical memory. In multimedia applications, this may cause the application to fail to complete required processing in time to prevent audio or video glitches from occurring.

In order to avoid difficulties, a realtime application process should not block a synchronization object that is also shared by non-realtime code for at least two reasons. First, if an application attempts to take a memory lock that another application is holding then the application attempting to take the memory lock stops running. Furthermore, if an application blocks during another CPU reservation, it may lose its entire reserved period. A scheduler tries to ensure the smooth running of the CPU reservation system, but if an application blocks, the scheduler may not allow it to run until the beginning of the next cycle. Even if an application doesn't lose its allotted period, it stops running until another application gives up the memory lock. The requesting application process may glitch and may not be able to keep data appropriately fed to hardware. For instance a video card buffer may be unable to remain full and the video card will run out of frames to display on the screen.

Additionally, ready to run threads that are in a CPU reserve will not be scheduled to run if that CPU reserve has completely spent its budget for the current period. Realtime code, or code that is running inside a CPU reserve, may call an Application Program Interface (API) in the system that grabs a synchronization object (i.e.: it takes a lock). If while holding the lock, the reserve runs out of budget, the code in the reserve will be preempted while it is still holding the lock. All other code in the system that tries to acquire that lock will block, and will not be able to run until after the reserve begins its next period and releases the lock. If realtime code holds a memory lock every time it runs out of CPU time, it could detain other applications for an extended period because the other applications cannot obtain the memory lock. Since the threads in the CPU reserve are not visible, the system doesn't see that other applications are blocked.

Accessing pageable memory may cause a page fault. Simply taking a page fault causes more code to run and may cause the realtime code to fail to meet a deadline. The duration of the delay caused by taking a page fault depends upon whether or not the page is present somewhere in physical memory or whether it must be retrieved from disk. A page fault that requires that memory pages be read in from disk is called a hard page fault. A page fault that can be handled without reading a page from disk, is called a soft page fault. Servicing a hard page fault can take on the order of 10 s of milliseconds since the system must wait for the hard disk to read the data and write it into memory. Furthermore the IO for reading that page may be queued up behind other IO which will have to complete first. Taking a hard page fault for a non-present page, for which a disk must be accessed, will cause many low latency realtime tasks to fail to meet their deadlines, as accessing a disk can take up to hundreds of milliseconds.

Although it is possible to write realtime code such that all required memory is allocated at the outset, most applications are not written in this manner. Instead, most applications including multimedia applications allocate memory on demand when they need it. Accordingly, a system is needed for managing memory for realtime threads such that sufficient memory is always present. Realtime threads may have very tight timing requirements that can only be met if the memory they access is always present or locked.

BRIEF SUMMARY OF THE INVENTION

In one aspect, the present invention is directed to a method for minimizing memory access latency during realtime processing by ensuring that all memory accessed during realtime processing is physically present in the system memory and not paged out to disk. The method includes marking code and data and other memory that will be accessed during realtime processing so that all memory containing the marked information can be locked down to ensure that it is physically present in the memory subsystem of the machine. The marked information may include code, data, stacks, heaps, variables or other information.

In an additional aspect, the present invention is directed to a system for maximizing or optimizing memory access during realtime processing. The system includes a marking module for marking information as realtime information. The system additionally includes a locking module for identifying marked realtime information and for locking memory required to implement the realtime information during processing.

In yet a further aspect, the invention includes a method for allocating memory for use during a realtime process in a non-blocking manner. The method includes creating a heap for use during realtime processing, wherein the heap supports a set of memory blocks having fixed sizes. The method additionally includes tracking freed memory blocks of particular sizes using separate non-blocking tracking lists for the different sized blocks, and determining based on the tracking list if a particular sized memory block can be allocated. If a memory block of the required size is available on the tracking list for that size, the method includes allocating the available memory block by popping the memory block from the tracking list. If a memory block of the required size is not available on a tracking list, then a set of source memory blocks is traversed, and the memory is allocated from one of the source memory blocks. Whenever memory is freed, it is placed on the tracking list for that sized block of memory. Finally, the size of requested memory allocations is rounded up to a size that matches the heaps supported memory block sizes.

In yet an additional aspect of the invention, an allocation system is provided for allocating memory for use during realtime processing in a non-blocking manner. The allocation system includes a source memory block list and a tracking list for tracking a status of each memory block as one of free and allocated. The allocation system additionally includes dynamic allocation tools for allocating memory using at least one of the source memory block list and the tracking list. The tracking lists are all implemented using non-blocking SLISTs which are singly linked lists that can have entries pushed and poped on and off of them in a non-blocking fashion. No traditional synchronization objects are used when allocating or freeing memory.

BRIEF DESCRIPTION OF THE DRAWINGS

The present invention is described in detail below with reference to the attached drawings figures, wherein.

DETAILED DESCRIPTION OF EMBODIMENTS

Overview

Embodiments of the present invention are directed to a system and method for managing memory in order to improve memory access during realtime processing. The system and method provide in one regard a solution that locks down essential memory for running realtime code. However, in any program, there will be parts that need to run realtime, as well as other parts that do not require the same responsiveness. Therefore, a mechanism is provided for identifying which memory should be locked and which should not. Furthermore, locking may be selectively implemented at chosen times such that a memory lock is not always required.

The system of the invention enables software developers to identify what code, data, constants, and stack need to get locked down when running realtime. The system also provides a mechanism for locking down all the identified memory in a process, as well as for unlocking all the identified memory. Accordingly, developers are able to mark their realtime memory, and then lock it and unlock it as needed.

The system of the invention additionally provides support for locking and unlocking stacks of threads running realtime. The system also supports locking and unlocking of a realtime heap that provides non-blocking allocations and frees. Allocations and frees can be made while running in a realtime thread without blocking.

Exemplary Operating Environment

Figure 1:
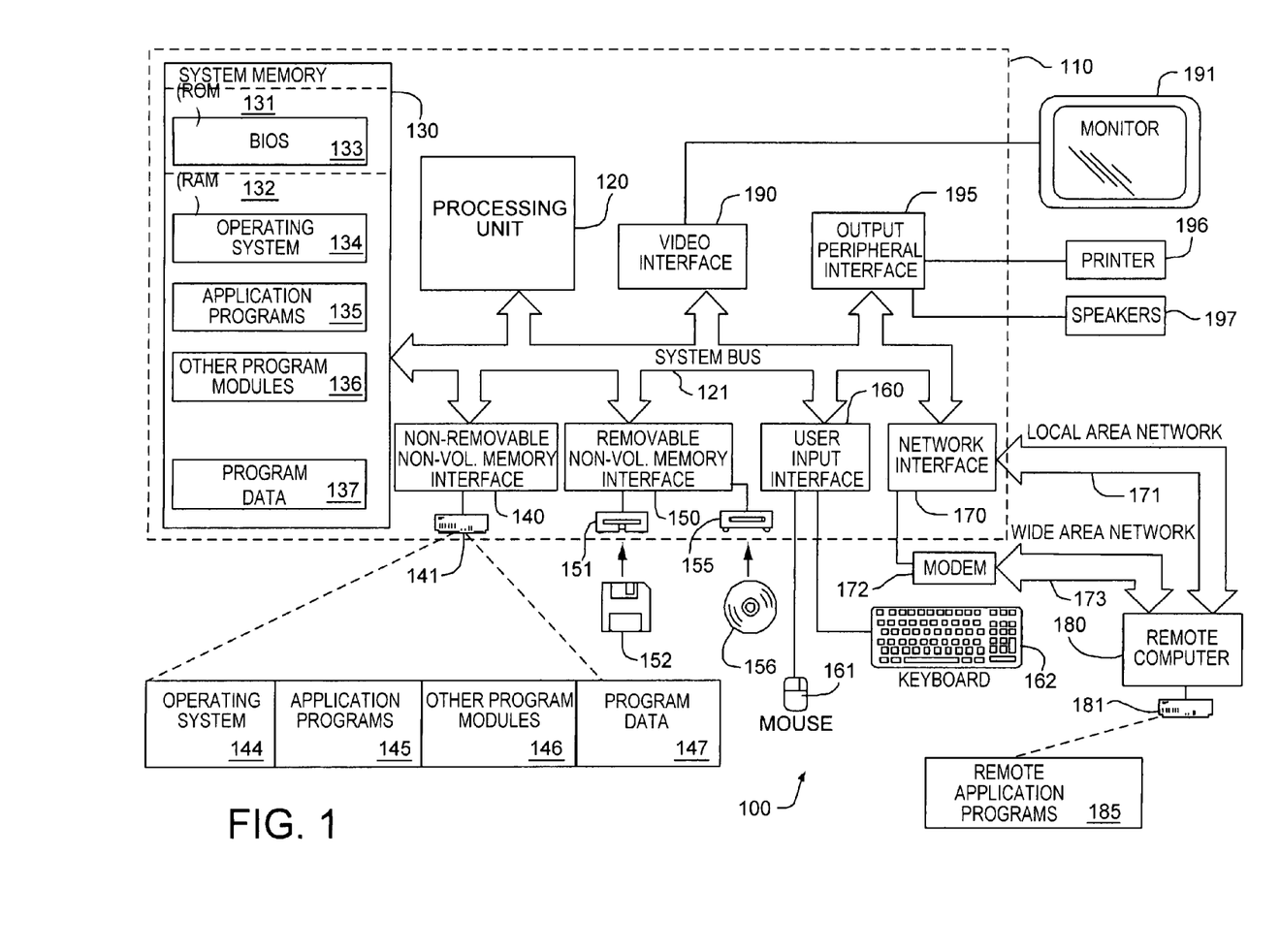
FIG. 1 is an exemplary computing environment in which the present invention may be practiced.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention may be described in the general context of computer-executable instructions, such as program modules, being executed by a computer. Generally, program modules include routines, programs, objects, components, data structures, etc. that perform particular tasks or implement particular abstract data types. Moreover, those skilled in the art will appreciate that the invention may be practiced with other computer system configurations, including hand-held devices, multiprocessor systems, microprocessor-based or programmable consumer electronics, minicomputers, mainframe computers, and the like. The invention may also be practiced in distributed computing environments where tasks are performed by remote processing devices that are linked through a communications network. In a distributed computing environment, program modules may be located in both local and remote computer storage media including memory storage devices.

With reference to FIG. 1, an exemplary system 100 for implementing the invention includes a general purpose-computing device in the form of a computer 110 including a processing unit 120, a system memory 130, and a system bus 121 that couples various system components including the system memory to the processing unit 120.

Computer 110 typically includes a variety of computer readable media. By way of example, and not limitation, computer readable media may comprise computer storage media and communication media. The system memory 130 includes computer storage media in the form of volatile and/or non-volatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136, and program data 137.

The computer 110 may also include other removable/nonremovable, volatile/nonvolatile computer storage media. By way of example only, FIG. 1 illustrates a hard disk drive 141 that reads from or writes to nonremovable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/nonremovable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through an non-removable memory interface such as interface 140, and magnetic disk drive 151 and optical disk drive 155 are typically connected to the system bus 121 by a removable memory interface, such as interface 150.

The drives and their associated computer storage media discussed above and illustrated in FIG. 1, provide storage of computer readable instructions, data structures, program modules and other data for the computer 110. In FIG. 1, for example, hard disk drive 141 is illustrated as storing operating system 144, application programs 145, other program modules 146, and program data 147. Note that these components can either be the same as or different from operating system 134, application programs 135, other program modules 136, and program data 137. Operating system 144, application programs 145, other program modules 146, and program data 147 are given different numbers here to illustrate that, at a minimum, they are different copies. A user may enter commands and information into the computer 110 through input devices such as a keyboard 162 and pointing device 161, commonly referred to as a mouse, trackball or touch pad. Other input devices (not shown) may include a microphone, joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. In addition to the monitor, computers may also include other peripheral output devices such as speakers 197 and printer 196, which may be connected through an output peripheral interface 195.

The computer 110 in the present invention will operate in a networked environment using logical connections to one or more remote computers, such as a remote computer 180. The remote computer 180 may be a personal computer, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160, or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181. It will be appreciated that the network connections shown are exemplary and other means of establishing a communications link between the computers may be used.

Although many other internal components of the computer 110 are not shown, those of ordinary skill in the art will appreciate that such components and the interconnection are well known. Accordingly, additional details concerning the internal construction of the computer 110 need not be disclosed in connection with the present invention.

Memory Management System

Figure 2:
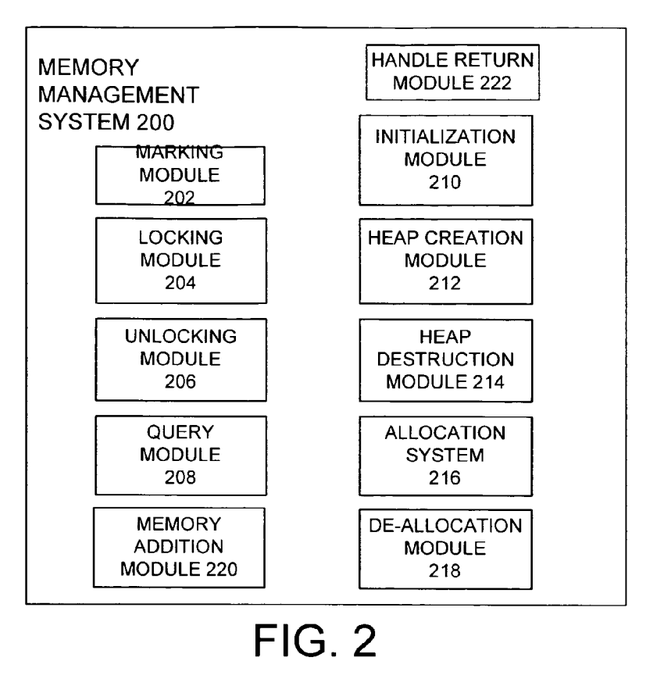
FIG. 2 is a block diagram illustrating specific components of a system in accordance with an embodiment of the invention.

FIG. 2 illustrates a memory management system 200 that may be stored in memory such as memory 134 of FIG. 1 in accordance with an embodiment of the invention. The system may include a marking module 202, a locking module 204, an unlocking module 206, a query module 208, an initialization module 210, a heap creation module 212, a heap destruction module 214, a memory allocation system 216, and a deallocation module 218, a memory addition module 220 and a handle return module 222.

Marking

The marking module 202 enables a developer to mark code, data, constants, heaps, stacks, or other structures as realtime. Subsequently, as will be described below, the system is capable of identifying the marked realtime data and locking down required memory during realtime processing.

Marking the code and data may be accomplished by using named sections and putting realtime code, data and constants in specifically named sections. The specific names of the sections are not critical as long as they are different from the default section names used for non-realtime information.

Code that will be run from within a realtime thread, as well as all global data that will be accessed from a realtime thread should be identified as being used by a realtime thread by implementing the marking module 202. Marking preferably includes using compiler pragma directives that place code that will be used in a realtime thread and data touched from a realtime thread in separate named sections in binary image files. Since all realtime code and data will be grouped together, they can be locked into memory in a simple fashion. Any function or method that can be called from within a realtime thread and any data that can be touched from within a realtime thread should be placed in the named realtime section.

Marking can be accomplished in several ways. For example, with C code, each function that can be called from realtime code should be marked at the beginning of the C file containing it. The marking line should follow the declaration and precede the definition. Accordingly, marking lines can be placed after headers that contain the function prototypes.

In C++ code, a different technique should be used. A line such as "#pragma RT_CODE_BEGIN" may be placed before the implementation of any methods that can be called from other realtime code. After the realtime methods and before the implementation of any nonrealtime methods, a line such as "#pragma RT_CODE_END" may be placed. This pair of macros can also be used with C code, but is not preferred since later modifications may place non-realtime code inside the #pragma pair.

With further reference to the C++ example, tables that contain pointers to realtime methods should also be marked as realtime. A technique for accomplishing this includes placing a line such as "#pragma RT_VTABLES_BEGIN" before definition of an object having realtime methods. After the object, a line such as "#pragma RT_VTABLES_END" may be placed.

Global data may also be marked as realtime. A line such as "RT_DATA" can be added for initialized data or "RT_BSS" for uninitialized data at the start of the line defining the variable. An error occurs if an uninitialized marking such as "RT_BSS" is placed prior to initialized data. This error causes initialized data to be treated like uninitialized data and it will likely be initialized to zero. Placing an initialized designation such as "RT_DATA" before uninitialized data will not cause an error, but may cause binaries to be larger than necessary. As will be explained below, local variables do not need to be marked, as they will be locked and unlocked automatically when an associated thread stack is locked and unlocked.

Data and code should not be marked as realtime unless it is touched from within a realtime processing path. It is important to minimize the amount of code and data touched from a realtime thread. Furthermore, realtime code should not call any functions that are not also marked as realtime. Likewise, no data should be touched from realtime code that is not marked realtime or allocated from a realtime heap. If non-realtime data or code is called from realtime code, because the non-realtime structures cannot be locked down, a page fault may occur and stop execution until the faulting location gets paged back in. This most likely will cause the realtime code to fail to complete within the required deadline. A tool may be provided that runs as part of a build process to ensure that realtime code is not calling out to non realtime code or data.

Figure 3:
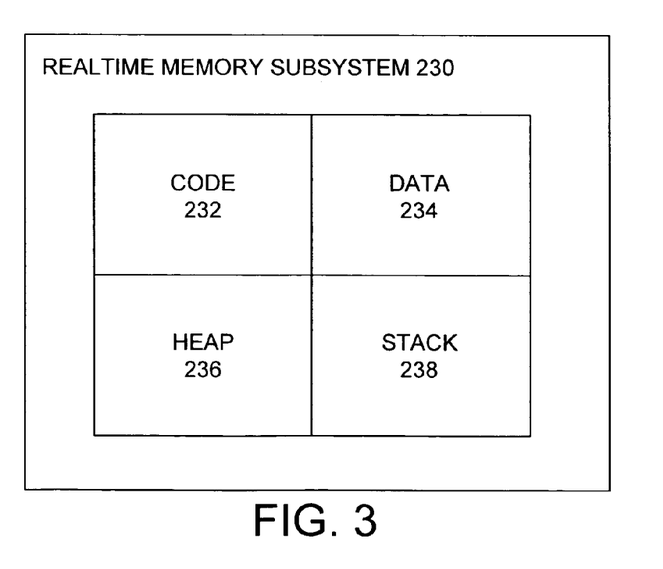
FIG. 3 is a block diagram illustrating a realtime memory subsystem in accordance with an embodiment of the invention.

The marking process creates a realtime memory subsystem 230 as illustrated in FIG. 3. The realtime memory subsystem may include, but is not necessarily limited to a code section 232, a data section 234, a heap section 236, and a stack section 238.

Locking and Unlocking

As set forth above, the developer may sort through image headers of every module loaded into a process, and identify any realtime sections that exist in that module. When the developer wants to lock down the realtime code, the locking module 204 sorts through every loaded module's image header and locks all of the realtime sections. When the developer no longer needs the realtime code, the unlocking module 206 sorts through the same image headers to unlock those sections.

As shown in FIG. 2, the locking module 204 implements a routine to identify structures marked as realtime and lock down the memory for processing. The routine may be called to lock code, data, and different classes of application memory that are marked with locked pragmas as described above. The locking module 204 may also lock down the realtime heaps and realtime thread stacks. However, if the routine is capable of blocking, it should not be marked as realtime.

A locking routine may include a memory type argument that supplies the type of realtime memory that should be locked. Supported types may include code, data, heaps, stacks, and all types combined. With the "all" designation, code, data, pool, and stacks of realtime threads may be locked for the process. If the specified memory cannot be locked, this function will fail. In an embodiment of the invention, the locking routine may also maintain a lock count. If the locking routine fails, adjustment of working set size can be made before re-trying the locking routine.

Also shown in FIG. 2, the unlocking module 206 may be called internally by the memory management system 200 to unlock the locked memory. This may occur in situations such as when realtime CPU requirements can no longer be met. Similarly to the locking routine, the unlocking routine may be able to block and therefore should not marked as realtime. The memory type arguments for unlocking are the same as those for locking. A value may be returned to indicate that memory has been unlocked.

Also shown in FIG. 2, the initialization module 210 may be used to initialize the realtime memory subsystem 230 shown in FIG. 3. The initialization module 210 includes an initialization routine that should be called before any other realtime memory functions are called. The routine sets the size of a realtime heap handle table that determines how many realtime heaps may exist in a realtime process at the same time. The use of heaps will be further explained below.

The initialization module 210 determines an initial locked or unlocked state of each class of realtime memory. It also creates a default realtime memory heap for the process. This function has potential to block and therefore should not be marked as realtime. After calling the initialization routine, the number of realtime heaps that can be created at the same time is limited. As will be further explained below, a default heap will consume one slot in the realtime heap handle table.

To set a class of memory to an initially locked state, the initialization sets the class or its identifier into an initial memory state. As set forth above, memory class identifiers may include realtime code, realtime data, realtime heap, and realtime stack.

Heap Creation

Also as shown in FIG. 2, a heap creation module 212 is provided to create a heap. In order to implement a heap creation routine, a bin descriptor structure may be implemented. The bin descriptor size and count should be set to a non-zero value. However, a bin descriptor alignment may be zero or non-zero. If the bin descriptor alignment is zero, a default heap alignment is used for that bin. In accordance with embodiments of the invention, the bin descriptor alignment must be a power of two. Each machine has a native pointer size and the bin descriptor alignment cannot be smaller than a machine's native pointer size. Bin descriptor alignment cannot be larger than the larger of the bin descriptor size and cache alignment. Bin descriptor sizes that are not multiples of the machine's native pointer size will be rounded up to that size.

Initially, the amount of required memory selected is based on an estimate. When creating a heap, descriptors providing an indication of the necessary sizes of memories and alignments are passed in. The heap creation module 212 will then create a block that is large enough to hold the estimated size plus some additional overhead for tracking. Upon heap creation, a bin keeps track of all of the allocations that are made. Every bin is for a particular size allocation. For every bin, the system keeps track of size of allocation, alignment of allocation, number of allocations of that size, slot for unused for alignment purposes, and an SLIST or tracking list of freed allocations. These components will be further described below.

Only specific allocation sizes are permitted. In accordance with an embodiment of the invention, default allocations for every heap are sized to be powers of two. Blocks sizes may be allocated for example up to eight MB. In this instance, if five bytes are requested, the system will find which bin is big enough to handle allocation.

The created heap will have a size that is the sum of (Size*Count) of all of the descriptors, plus an [(overhead per allocation)*(sum of Count)] of all of the descriptors. The overhead per allocation depends on the heap attributes. If any of the bin descriptor sizes is not a power of two, then an extra bin for that specific size will be added to the default set of memory bins.

In the heap creation routine, the descriptor count must be at least one. An argument should identify a pointer that points to at least one memory bin descriptor. The memory bin descriptors are used to determine the size of the heap as well as the default alignment of blocks in the heap. The heap creation routine may be able to block and therefore should not be marked as realtime.

The arguments pertinent to the heap creation module 212 include an argument that supplies a pointer to a handle that will be used to use to access the heap after creation. The heap creation module 212 further includes a heap attributes argument that supplies flags that control determination of certain heap characteristics. A descriptor count argument supplies the number of bin descriptors receiving pointers. An argument is provided that points to the descriptor count of the bin descriptors. The aforementioned arguments are used to determine how large the heap will be as well as what unique memory bins, if any, will be supported by this heap. If the desired amount of locked memory cannot be acquired, this function will fail and a NULL handle value will result.

The heap creation module 212 sets up a source block of memory that is carved up into individual allocations by calling an memory allocation system 216, further described below. The memory created by the heap creation module 212 may be committed and locked.

Because conservation of memory is a goal, the amount of locked memory should be minimized. Memory amounts that are indeterminate at the time of heap creation should be added later using a memory addition module 220 once the amount of required memory can be accurately determined. The memory addition module 220 will be described in greater detail below.

A handle return module 222 may provide a process for returning a handle to a default realtime heap for the current process. Most processes should use the default process realtime heap for allocations of structures and objects that will be used during realtime processing. This process is realtime safe and does not block. It should be marked as realtime code.

In preferred embodiments, components do not create their own private realtime heaps for the allocation of objects and small data structures. If a component is going to allocate a number of large blocks of memory (for instance, larger than 16 KB), or make a very large number of small allocations, and the expected lifetimes of those allocations are less than the process lifetime, the component should create a private realtime heap for those allocations. This enables memory to be reclaimed by the system when the private realtime heap is destroyed. For example, most frame buffers and audio processing buffers having a size that depends on the format of the data should be allocated from a private heap that is created after the format of the data is known. The created heaps should be destroyed when the processing of that format is complete and the buffers have been freed. Each time processing starts on a different format, a new private realtime heap should be created with the expected number and size of the buffers that will be required for processing that format.

The heap destruction module 214 also shown in FIG. 2 may be used to destroy heaps created by the heap creation module 212. The heap destruction module 214 may be able to block so should not be marked as realtime. This function is provided to free all of the memory used by the heap and close the handle as well. The heap destruction module 214 may include an argument that supplies the handle of the heap to destroy. If the desired amount of locked memory cannot be acquired, this function will fail.

Heap Allocation and De-allocation Procedures

The allocation system 216, also shown in FIG. 2, can be used either prior to or during processing in order to allocate locked blocks of memory in a non-blocking fashion. Ideally all allocations of memory that will be touched from inside a realtime thread are made at setup time, before the realtime thread starts processing data. For the cases when it proves impossible to properly allocate all memory that will be used in advance, this function can safely be called from within a realtime thread to allocate locked realtime safe memory.

The arguments provided for the allocation system 216 may include an argument for supplying a handle to the heap from which memory will be allocated and a size in bytes of the block of memory to be allocated. A flags argument supplies flags imposing requirements on the allocation, and a size arguments for supply the size in bytes of the block of memory to be allocated. An pointer to memory argument supplies a pointer to memory where the pointer returned from heap allocation call will be written. The heap allocation system 216 will return a result identifying specific errors. The pointer to memory will be written with the address of the allocated block. If the allocation does not succeed, the pointer to memory will be written with a NULL value.

Figure 4:
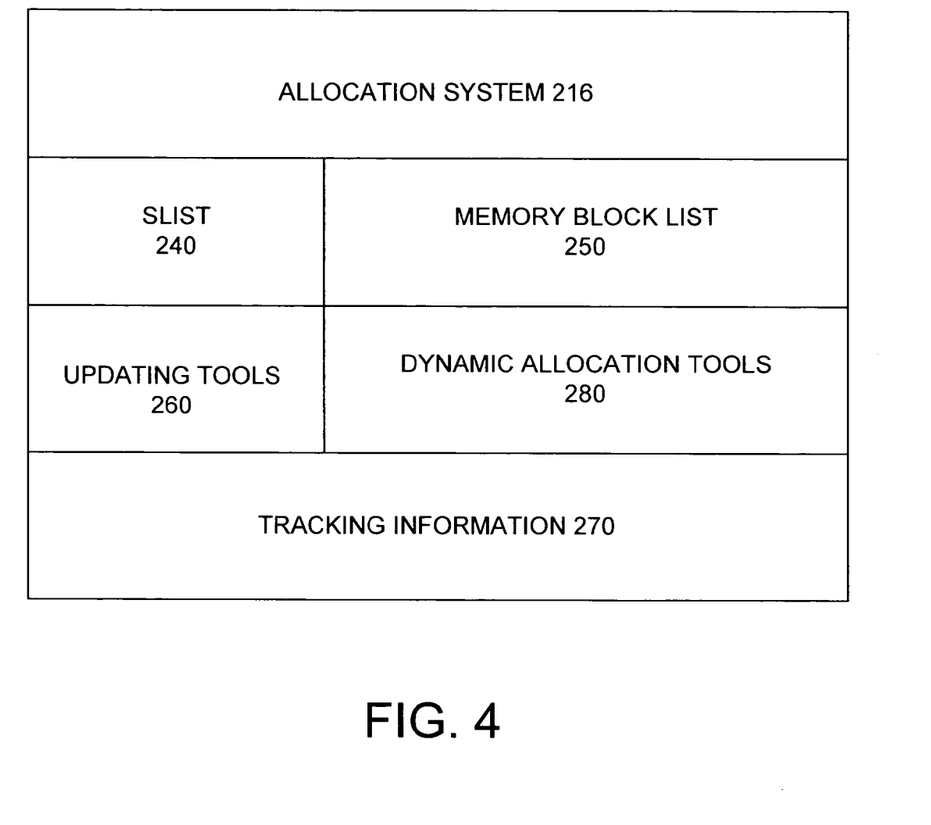
FIG. 4 is a block diagram illustrating components of a memory allocation system in accordance with an embodiment of the invention.

FIG. 4 illustrates features of the allocation system 216 in accordance with an embodiment of the invention. The allocation system 216 may include or access SLISTs 240, a memory block list 250, updating tools 260, dynamic allocation tools 280, and tracking information 270.

These components interact to allocate and de-allocate memory. The heap allocation system 216 may first implement the dynamic allocation tools 280 to find a correct memory bin for the requested allocation size by using a binary search. The bin size may match the search size exactly or alternatively, may not be an exact match, but may be the smallest bin large enough for the requested size. An SLIST 240 may be provided for each size of memory block to track which memory blocks are currently free. The tracking information 270 may include additional tracking information including information pertaining to memory blocks that are in use. Upon operation of the dynamic allocation tools 280, the updating tools 260 may update the appropriate SLIST 240 and tracking information 270.

When allocation is requested, if no blocks of the selected size are available, the dynamic allocation tools 280 may use an Interlocked Compare Exchange 64 (ICE 64) operation to divide memory into smaller allocations as will be further described below. Allocations and frees are made in this manner are non-blocking. This may be achieved by forcing all allocations to be from a given set of sizes. The default sizes are all powers of two, but additional sizes can be specified at heap creation time by passing in additional information in the parameters specified in the heap create call. However, once the heap has been created, all possible different sizes of memory blocks that can be supported are known and fixed. In addition, a caller can estimate the number of each different size allocation that will be made, and this estimate will be used to allocate an initial block of memory large enough to hold all of the heap blocks as well as the additional memory or overhead required for tracking those blocks.

When an allocation is made, the dynamic allocation tools 280 round the size up to the memory allocation size that is large enough for that allocation. Then the SLIST 240 of all of the freed memory blocks of that size is checked, and if a block is available, it is popped off the SLIST 240 and used for the allocation.

If no free blocks are identified on the SLIST 240, then the list 250 of big memory blocks is traversed, and for each block, an attempt is made to allocate that size memory block as well as the overhead for that allocation. The allocation is made in a non-blocking fashion by using the ICE 64 operation, that updates the offset to the memory as well as the offset to its tracking memory simultaneously. The tracking information 270 may be separated from the allocation itself in order to prevent corruption. However, the system could be designed such that the allocation is contiguous with the tracking information 270.

If the allocation is successfully made, then the updating tools 260 update the tracking information 270 and the SLIST 240, and return the pointer to the memory block. The tracking information 270 includes a control block for each allocated block of memory. The dynamic allocation tools 280 allocate the control block at the same time the memory block is allocated. The control block may be used to keep track of the memory block when it is freed as well as to hold information about the memory block when the memory block is allocated.

The control block stores different information depending on whether the allocated block of memory is currently in use or free. If the allocated memory block is in use, then the control block holds a pointer to the memory bin that will track this block when the block is freed. The control block also includes a tag that was generated when the block was allocated and was returned to a caller along with the pointer to the memory. If the memory block is free, then the control block holds a pointer to the memory block and is placed on the free SLIST 240 in the memory bin for the block.

Whenever an allocation is freed, its tracking information 270 is looked up, and the allocation is pushed on the SLIST 240 of free blocks of that size memory. Each different supported memory block size has an associated SLIST 240 of the free blocks of that size. Once a block is allocated to a particular size, it is never resized.

As set forth above, a small overhead is associated with each allocation made from the realtime heap. This overhead depends on heap attributes passed in at heap creation time. The total overhead per allocation is a control block. The control block is the size of an SLIST entry plus a pointer, plus a single pointer to the control block that may be placed just before the start of every allocated block. In embodiments of the invention, the default block alignment is 8 bytes. For that block alignment, the overhead is 16 bytes per allocation on X86 machines. For the same alignment, the overhead is 24 bytes on AMD64 and IA64.

If the SLIST 240 indicates that no memory blocks of the appropriate size are free, the dynamic allocation tools 280 perform the ICE 64 operation on the source memory block on two offsets. A first offset is for overhead (the control block) and a second offset is for the memory allocation. In embodiments of the invention, these may initially include two 32 bit offsets. The dynamic allocation tools 280 set up pointers to an inbound state and compare a second parameter to a current value. If a match is found, the process takes the second parameter. If no match occurs, the current value is returned. In a first loop, the dynamic allocation tools 280 go through the list 250 of big blocks and make an allocation. A non-matching value is selected so that the current value is returned. The process then adds the returned value to the two offsets to obtain two numbers. Through subtraction, the dynamic allocation tools will check to see where the two points cross. As long as the two numbers are equal or the offset for the allocation is larger than the offset for the overhead, then the loop continues. If the operation succeeds, the system breaks out of the loop. If the offset for the allocation becomes smaller than the offset for the overhead, then the points cross and no space remains. In this instance, the dynamic allocation tools 280 may check for another memory block on the heap, point to the next memory block, and repeat the loop. The operation repeats the loop until it succeeds and gets memory or until it runs out of memory. When the operation succeeds, the non-blocking SLIST 240 keeps track.

Furthermore, when allocations are freed, the SLIST 240 tracks this operation. Whenever the memory management system 200 frees an allocation of a particular size, it pushes the allocation on the SLIST 240. The SLIST 240 is preferably a singly linked list that is non-blocking. Items can be pushed on and popped off the list in a non-blocking fashion. To make an allocation, the dynamic allocation tools 280 attempt to pop off an allocation from the SLIST 240. If successful, the process is complete. If not, the dynamic allocation tools 280 go into loop with the memory block list 250 described above. Once the dynamic allocation tools 280 have sized a piece of memory, that piece of memory can never be re-sized, although it can be re-used.

The allocation system 216 works well for code that will continue to perform same operations over and over again. The system will be pushing and popping allocations on and off the SLIST 240. The memory management system 200 can lock all blocks of memory down when instructions say to lock the heap down and conversely can unlock the heap according to instructions. Typically, for multimedia code, this allocation system 216 works well because the same blocks can be used over and over again.

The deallocation module 218, also shown in FIG. 2, is called to free memory allocated by a call to the allocation system 216. When the system frees an allocation, it points to the memory block from the control block and pushes the control block onto the SLIST 240 so that the SLIST 240 has a control structure for every allocation. The SLIST 240 actually stores control blocks with pointers that point back to actual memory slot.

The deallocation module 218 may free the handle to the heap from which the memory was allocated and the pointer the heap. If the pointer to memory points to a block of memory allocated by a call to the allocation system, then the pointer will be cleared to NULL. If the pointer to memory does not point to a block of memory allocated by a call to the allocation system, then an error will be returned and no memory will be freed.

The above-described function for freeing memory blocks will normally be called as part of shutting down after the processing in the realtime thread is complete. However, the deallocation module 218 can be configured to be realtime safe to operate in a non-blocking fashion.

Memory Addition

A memory addition module 220, also shown in FIG. 2 may be used to add one or more blocks of memory to the memory block list 250. The memory addition module may be used if calls to the allocation system 216 are unsuccessful due to lack of memory. The memory addition module 220 includes a descriptor count that supplies the number of descriptors pointed to by a memory bins pointer. The memory bins pointer points to at least one memory bin descriptor. The memory bin descriptors are used to determine the size of the block of memory to add to the list. No additional bins are added to the set of memory bins created at the time of heap creation. The purpose of using memory descriptors is to allow a caller to indicate expected memory use so that the overhead associated with the expected allocations can be factored into the size of the block of memory.

If the desired amount of locked memory cannot be acquired, this function will fail. This function should only be used when additional memory needs to be added to a heap, and the size of the additional memory could not be adequately predicted at heap creation time. This function sets up additional source blocks of memory that can be carved up into individual allocations by calling the allocation system 216. This function will attempt allocate and commit the number of bytes specified and will add any new blocks to a list of source memory blocks for the specified heap. If the current state of heap memory is locked, then this function will lock the memory block as well.

Stacks

Stacks can also be locked down. The system tracks every thread that is created and destroyed after it has been loaded in the process. When the developer makes a call to lock down the stacks, a list of threads is traversed, and every thread is checked to see if it is a realtime thread (in a reserve) or not. If the thread is realtime, then its stack is locked. If not, its stack is not locked. Stacks can be unlocked as well. To unlock the stacks, all the existing threads are traversed, and if their stack was locked, then it is unlocked.

Queries

A query module 208, also shown in FIG. 2 may include a routine capable of obtaining information about the realtime memory subsystem shown in FIG. 3. Two types of information that can be obtained through a memory query routine are: 1) counts of the maximum, current, and locked number of objects; and 2) size in bytes of all of the objects, as well as locked size in bytes. The counts are returned in a real time memory count structure and the sizes are returned in a realtime memory size structure. This information can be obtained for each class of memory. In addition, an overall total of the counts and sizes of all of the memory managed by this subsystem can be obtained.

A memory information class argument identifies which query is being made. Examples of queries include: realtime memory code counts, realtime memory code size, realtime memory data count, realtime memory data size, realtime memory heap count, and realtime memory heap size, realtime memory stack count, realtime memory stack size, realtime memory count, and realtime memory size. A memory information argument supplies a pointer to a block of memory to which the returned information will be written. The returned information may be a real time memory count structure for count queries and a realtime memory size structure for size queries. An information length argument supplies the size in bytes of a pointer information memory block. A return length argument supplies a pointer to a length of the data returned by the query call. This parameter can be set to NULL when this information is not desired.

Another routine that may be implemented by the query module 208 is a heap information query. A heap information class may contain information such as number of bins, bin sizes, number of source blocks, source block sizes, total memory, total memory available, total memory not allocated, largest possible allocation, bin usage information, and bin statistics. Queries may ascertain statistics, sizes, availability, types of memory, total allocations from a bin, current allocated, current available, etc. Furthermore it may be possible to query a current state of memory to indicate whether the memory is locked or not.

Another available query through the query module 208 includes a pointer information query. The pointer information query may be called to obtain information about a pointer allocated by a call to the heap allocation system 216. At least three types of information may be obtained about a pointer including: 1) the heap it was allocated from; 2) the actual size of the memory block it points to; and 3) whether the allocation currently appears valid. An allocation may be validated by checking that the block is currently in an allocated state, that markers before and after the block have not been overwritten, and that a tag passed in a pointer information parameter matches the tag returned when the block was allocated.

Arguments for the pointer information query may include a pointer that supplies the pointer returned from a call to the heap allocation system 216. A pointer information class argument may identify whether a heap, size or validation type query is being made. A pointer information argument may supply a pointer to a block of memory to which the heap handle or pointer size will be written. An information length argument supplies the size in bytes of the pointer information memory block.

Figure 5:
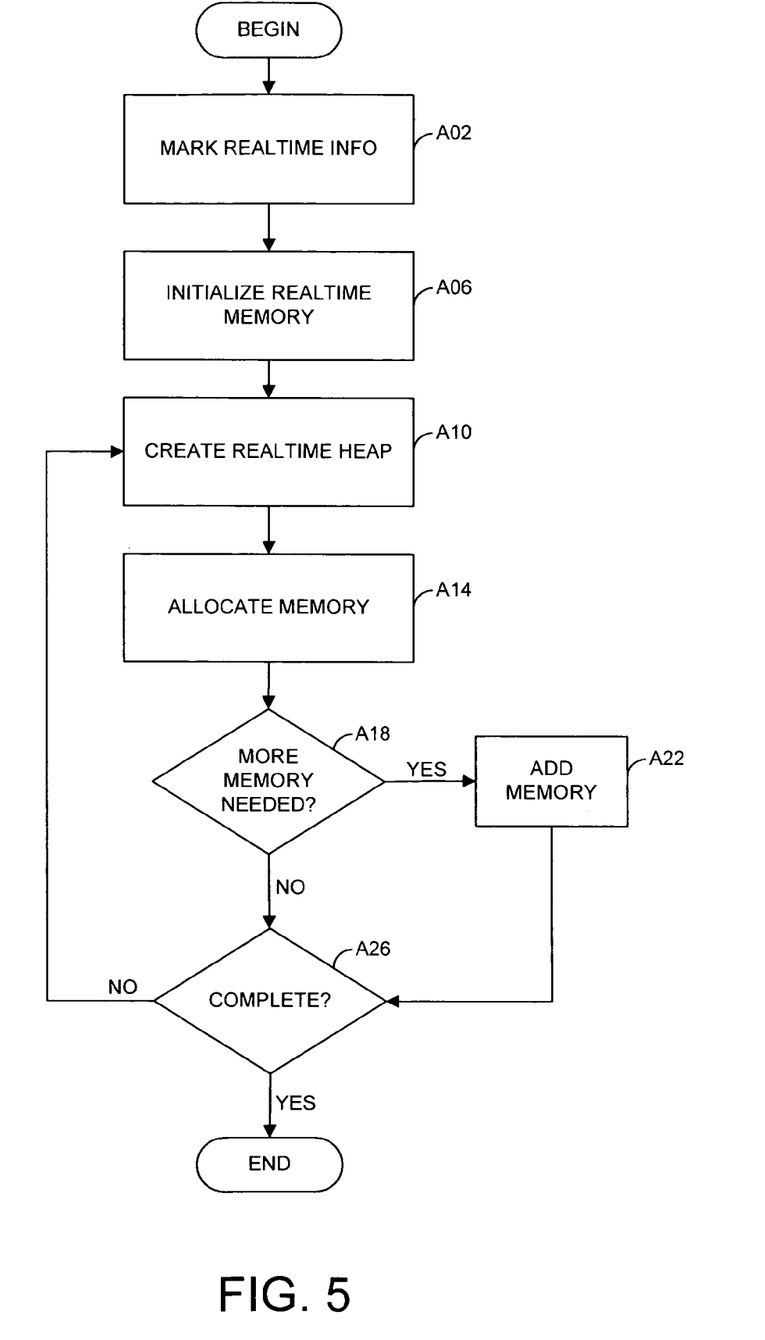
FIG. 5 is a flow chart illustrating a method for managing memory in accordance with an embodiment of the invention.

FIG. 5 illustrates a method for managing memory in accordance with an embodiment of the invention. This sequence of procedures is merely exemplary of a manner in which the memory management system 200 may be used to manage memory. The steps shown in FIG. 5 may occur prior to real time processing and are executed substantially as described above with regard to each provided module. The order of execution shown in FIG. 5 is merely exemplary and should not be construed as limiting. In step A02, a developer uses the provided tools to mark realtime information such as realtime code, realtime data, and realtime constants. In step A06, an API can be used to initialize realtime memory. In step A10, the memory management system creates a realtime heap. In step A14, the memory management system allocates memory. In step A16, the system determines if more memory is needed. If more memory is needed in step A18, the system adds memory in step A22. If no more memory is needed in step A18, the system determines whether the process is complete in step A26. If the process is not complete in step A26, the process returns to step A10 for creation of an additional realtime heap. The aforementioned procedures preferably take place prior to the running of the realtime process.

Figure 6:
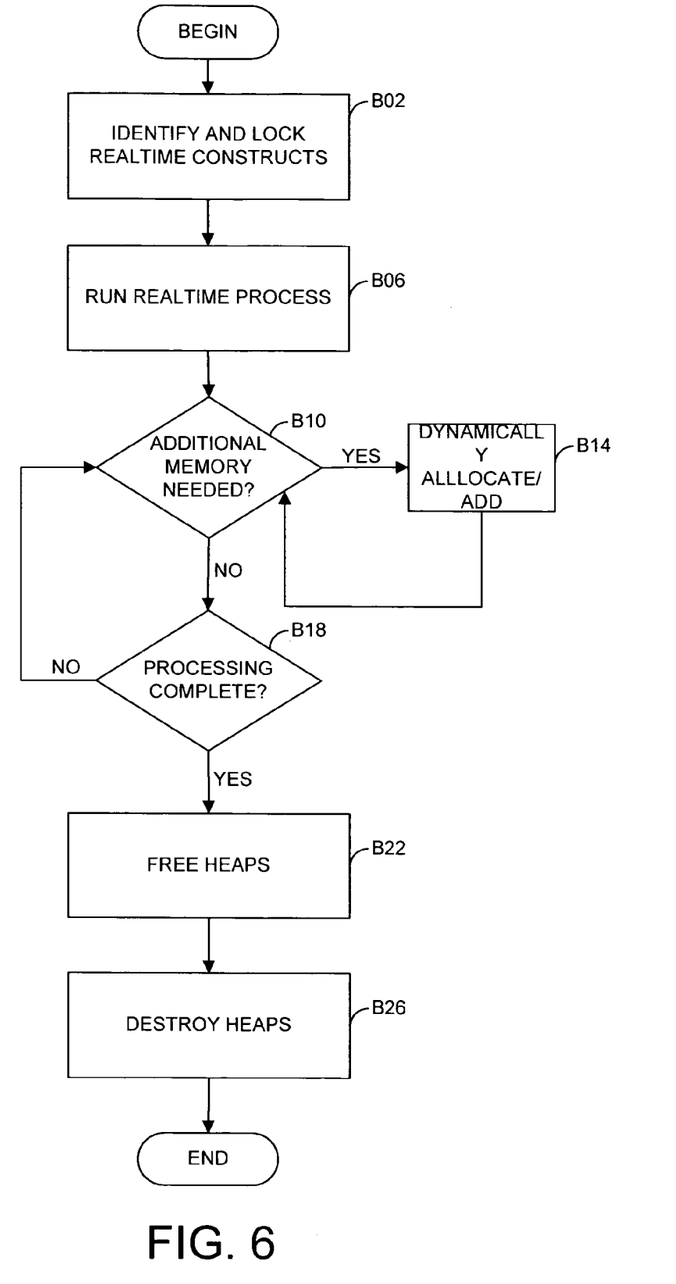
FIG. 6 is a flow chart illustrating a method for allocating memory in accordance with an embodiment of the invention.

FIG. 6 is a flowchart illustrating further memory management procedures in accordance with an embodiment of the invention. This sequence of procedures is merely exemplary of a manner in which the memory management system 200 may be used to manage memory. Other sequences of procedures as described above may also be implemented. In step B02, the system identifies and locks realtime constructs. In step B06, the realtime process begins running. In step B10, the system determines if additional memory allocation is needed. If additional memory allocation is needed in step B10, the system dynamically allocates the memory in step B14. If no additional memory is needed in step B10, the system determines if processing is complete in step B18. If processing is complete, the system frees the created heaps in step B22 and destroys the freed heaps in step B26.

This document thus describes a system for managing memory that will be accessed from code running in realtime threads. Realtime threads may have very tight timing requirements that can only be met if the memory they touch is always locked. The system allows realtime clients to lock and unlock their realtime code and global data, as well as their stacks and realtime heaps. The system supports allocating and freeing memory from a realtime heap in a non-blocking fashion.

While particular embodiments of the invention have been illustrated and described in detail herein, it should be understood that various changes and modifications might be made to the invention without departing from the scope and intent of the invention. The embodiments described herein are intended in all respects to be illustrative rather than restrictive. Alternate embodiments will become apparent to those skilled in the art to which the present invention pertains without departing from its scope.

From the foregoing it will be seen that this invention is one well adapted to attain all the ends and objects set forth above, together with other advantages, which are obvious and inherent to the system and method. It will be understood that certain features and sub-combinations are of utility and may be employed without reference to other features and sub-combinations. This is contemplated and within the scope of the appended claims.

What is claimed is:

1. A method for minimizing memory access latency during a realtime process by preventing memory required for the realtime process from being paged out to disk, the realtime process implementing information marked as realtime information, the method comprising:
   identifying the marked information as realtime information; and
   locking memory required to implement the realtime information during realtime processing to ensure that the memory required during the realtime processing is physically present in a memory subsystem, wherein locking memory comprises locking a realtime heap that allocates memory blocks and a realtime thread stack corresponding to the realtime process and updating the realtime heap with additional locked memory blocks when an allocation fails during execution of a realtime thread in the realtime thread stack, wherein a private realtime heap is created when the realtime process requests a number of large blocks of memory, or a large number of small allocations, and an expected lifetime of the requested allocation allocations of memory blocks is less than a lifetime corresponding to multimedia data associated with the realtime information read by the realtime process.

2. The method of claim 1, further comprising identifying marked code as realtime information.

3. The method of claim 1, further comprising identifying marked data as realtime information.

4. The method of claim 1, further comprising unlocking the required memory after realtime processing has completed.

5. The method of claim 1, further comprising creating a list of memory blocks prior to realtime processing and creating a tracking list for keeping track of memory block status, wherein memory block status is one of free and allocated.

6. The method of claim 5, wherein dynamically allocating memory during realtime processing comprises traversing the tracking list to determine if a memory block is available and popping an available memory block off the tracking list to allocate the available memory block.

7. The method of claim 5, wherein dynamically allocating memory during realtime processing comprises traversing the tracking list to determine if a memory block is available and if no memory block is free, traversing the list of memory blocks.

8. The method of claim 7, further comprising updating an offset to the memory list and updating a tracking offset in order to make an allocation from the list of memory blocks.

9. The method of claim 8, further comprising updating the tracking list and returning a pointer to an allocated memory block upon making an allocation.

10. The method of claim 5, further comprising dynamically allocating memory during realtime processing without blocking.

11. The method of claim 10, further comprising creating allocations from a pre-defined set of sizes in the list of memory blocks.

12. The method of claim 10, further comprising adding additional memory if allocation is not possible.

13. A computer-storage medium storing computer executable instructions for performing the method of claim 1.

14. A system for optimizing memory access during realtime processing and for preventing memory from paging out to disk, the system comprising:
   a marking module for marking information as realtime information; and
   a locking module for identifying marked realtime information and for locking memory required to implement the realtime information during processing in order to ensure presence of the required memory in a physical memory subsystem, wherein the locking module locks realtime thread stacks and corresponding local variables;
   a heap creation module for creating a realtime heap comprising a source block of memory for the required memory, wherein the realtime heaps include private realtime heaps for each audio data format or video data format associated with the realtime information, wherein the private realtime heaps are created when the realtime process requests a number of large blocks of memory, or a large number of small allocations, and an expected lifetime of the requested allocations is less than a lifetime corresponding to different formats read by the realtime process; and
   an allocation module for allocating memory for use during realtime processing in a non-blocking manner, the allocation module comprising:
      a source memory block list for the realtime heaps;
      a tracking list for each size of memory block, the tracking list for tracking a freed status of each memory block; and
      dynamic allocation tools for allocating memory using at least one of the source memory block list and the tracking list to create memory blocks that store realtime information that corresponds to the requests generated by one or more threads in the realtime thread stack.

15. The system of claim 14, wherein the dynamic allocation tools access the tracking list to locate a free block and pop the free block from the tracking list in order to allocate the block.

16. The system of claim 14, wherein the dynamic allocation tools access the tracking list to locate a free block and traverse the source memory block list if no free block is available on the tracking list.

17. The system of claim 16, further comprising updating tools for updating a memory offset and a tracking memory offset during traversal of the source memory block list in order to make an allocation.

18. The system of claim 16, wherein the updating tools further update the tracking list and return a pointer to an allocated memory block upon making an allocation.

19. A method for allocating memory for use during a realtime process in a non-blocking manner, the method comprising:

tracking available memory blocks from a memory block source using a non-blocking tracking list corresponding to a size of memory block, wherein the available memory blocks have different sizes and are included in a private realtime heap that is created when the realtime process requests a number of large memory blocks, or a large number of small allocations, and an expected lifetime of the requested allocation of large memory blocks is less than a lifetime corresponding to an audio format or a video format implemented by the realtime process;

determining based on the tracking list if a memory block of the selected size is available;

if an available memory block is specified on the tracking list, allocating the available memory block by popping the memory block from the tracking list; and if no memory block is available on the tracking list, traversing a memory block source list to make an allocation.

20. The method of claim 19, wherein traversing the set of memory blocks to make an allocation comprises simultaneously updating a memory offset and a tracking memory offset.

21. The method of claim 20, further comprising adding additional memory if traversing the set of memory blocks fails to result in an allocation.

22. The method of claim 20, further comprising updating the tracking information and the set of memory blocks if traversing the set of memory blocks results in an allocation.

23. The method of claim 19, further comprising deallocating memory no longer required for realtime processing and pushing the deallocated memory onto the tracking list.

24. A computer-storage medium storing computer executable instructions for performing the method of claim 19.

* * * * *

UNITED STATES PATENT AND TRADEMARK OFFICE
CERTIFICATE OF CORRECTION

PATENT NO. : 7,587,566 B2  Page 1 of 1
APPLICATION NO. : 10/945093
DATED : September 8, 2009
INVENTOR(S) : Ballantyne et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 319 days.

Signed and Sealed this

Twenty-first Day of September, 2010

David J. Kappos
*Director of the United States Patent and Trademark Office*